United States Patent Office 3,134,818
Patented May 26, 1964

3,134,818
PRODUCTION OF AROMATIC THIOETHERS
Basil S. Farah and Everett E. Gilbert, Morris Township, Morris County, N.J., assignors to Allied Chemical Corporation, New York, N.Y., a corporation of New York
No Drawing. Filed Jan. 29, 1962, Ser. No. 169,647
10 Claims. (Cl. 260—609)

This invention relates to an improved process for the production of aromatic thioethers. More specifically, the invention concerns the production of alkylmercaptophenols, and particularly 4-alkylmercaptophenols, by reacting phenolic compounds with dialkyl disulfides in the presence of sulfonic acid catalysts.

Many phosphates and thiophosphates derived from alkylmercaptophenols are extremely potent insecticides. For example, the high insecticidal activity of diethyl 4-methylmercaptophenyl phosphate derived from 4-methylmercaptophenol is described by Fukuto and Metcalf in the Journal of Agricultural and Food Chemistry, volume 4 (1956), pages 930–935.

Commercialization of these phosphates and thiophosphates has been hampered by lack of a simple and economical method of preparing the intermediate alkylmercaptophenols. The method now generally employed, with specific reference to the preparation of 4-methylmercaptophenol, involves starting with the highly expensive 4-aminophenol, converting it to 4-mercaptophenol via the difficult and dangerous diazonium reaction and then methylating the mercapto group. It has also been proposed to prepare alkylmercaptophenols by reacting phenolic compounds with dialkyl disulfides in the presence of catalysts, including aluminum chloride, aluminum bromide, ferric chloride, zinc chloride, tin tetrachloride, antimony pentachloride, boron fluoride and bleaching earth. In order to obtain acceptable yields of alkylmercaptophenols, it is necessary to employ the catalyst in at least molecular amount with respect to the dialkyl disulfide. Moreover, in the reaction of phenolic compounds with dialkyl disulfides, the halide catalysts generally yield predominantly the 2-isomers rather than the more desirable 4-alkylmercaptophenols. Bleaching earth is disadvantageous since it is abrasive to conventional processing equipment. Further, it is cumbersome to recover since it must be filtered and washed with an organic solvent.

The primary object of the present invention is to provide an economical and efficient process for the production of aromatic thioethers.

A more specific object is to provide an economical and efficient process for the production of alkylmercaptophenols, and particularly 4-alkylmercaptophenols, by reacting phenolic compounds with dialkyl disulfides in the presence of sulfonic acid catalysts.

A still more specific object is to provide an economical and efficient process for the production of methylmercaptophenols, and particularly 4-methylmercaptophenols, by reacting phenolic compounds with dimethyl disulfide in the presence of sulfonic acid catalysts.

Other objects and advantages of the invention will appear hereinafter.

In accordance with the present invention, it has been found that aromatic thioethers may be produced in high yield by reacting a nuclearly hydroxy-substituted aromatic compound containing at least one free 2- or 4-position with a dialkyl disulfide in the presence of a sulfonic acid as catalyst, the mol ratio of the sulfonic acid to dialkyl disulfide being not more than about 0.25 to 1.

The nuclearly hydroxy-substituted aromatic compounds which are preferred in the process of this invention are phenolic compounds selected from the group consisting of phenol and alkyl-substituted, aryl-substituted, halo-substituted and alkoxy-substituted phenols containing a free 4-position. Representative of these compounds are phenol, 3-isopropylphenol, 3-tert.-butylphenol, 3-methylphenol (3-cresol), 3-ethylphenol, 3-methyl-6-isopropylphenol, 3,5-diisopropylphenol, 2,6-diisopropylphenol, 2-methyl-5-isopropylphenol, 2,6-di-tert.-butylphenol, 3,5-dimethylphenol, 2-phenylphenol, 3-chlorophenol and 3-methoxyphenol. Other suitable nuclearly hydroxy-substituted aromatic compounds include 4-methylphenol (4-cresol), 4-chlorophenol, 1-naphthol and 2-naphthol.

The dialkyl disulfide employed in the process of the invention preferably contains alkyl groups having 1 to 5 carbon atoms. Among the suitable dialkyl disulfides are dimethyl disulfide, diethyl disulfide, di-n-butyl disulfide, di-i-butyl disulfide, di-n-amyl disulfide, di-i-amyl disulfide and di(chloromethyl) disulfide. Generally speaking, about 0.5 to 2.0 mols of disulfide per mol of aromatic compound are used, the preferred mol ratio being about 1 to 1.

The sulfonic acid catalyst may be employed in three forms: (1) as a sulfonic acid per se such as methanesulfonic acid, benzenesulfonic acid, toluenesulfonic acid, ethanesulfonic acid, etc., (2) as a sulfonic acid formed by adding sulfuric acid to the nuclearly hydroxy-substituted aromatic compound and (3) as an acid form ion-exchange resin such as "Dowex–50" (a sulfonated styrene-divinyl benzene copolymer having a total exchange capacity ranging from 0.3 to 2.3). We prefer to use a sulfonic acid catalyst obtained by the addition of sulfuric acid to the nuclearly hydroxy-substituted aromatic compound. Such catalyst is advantageous from the standpoint of economy and, in addition, has been found to give particularly outstanding results.

In order to attain high yields of aromatic thioethers, it is essential to employ not more than about 0.25 mol of sulfonic acid catalyst per mol of dialkyl disulfide. Preferably about 0.04 to 0.25 mol of sulfonic acid catalyst per mol of dialkyl disulfide is utilized. When the catalyst is a sulfonic acid formed by the addition of sulfuric acid to the nuclearly hydroxy-substituted aromatic compound, maximum yields are obtained using about 0.04 to 0.1 mol of catalyst per mol of disulfide.

The process of the invention is preferably carried out at the refluxing temperature of the reaction mixture. Generally speaking, this temperature is within the range of about 140° to 150° C.

In typical operation, the dialkyl disulfide is slowly added to a refluxed agitated mixture of the nuclearly hydroxy-substituted aromatic compound and the sulfonic acid catalyst. The resulting mixture is then vacuum distilled to recover the desired product. As preferred, a phenolic compound containing a free 4-position and the sulfonic acid catalyst are mixed in a reaction vessel, and the mixture is heated to refluxing temperature. The dialkyl disulfide is then added slowly with stirring, e.g. over a period of about ¼ to 4 hours. Refluxing takes place steadily, and alkyl mercaptan is evolved as the reaction progresses.

After addition of the dialkyl disulfide, the mixture is refluxed for an additional period of about 1 to 4 hours and then vacuum distilled for product recovery.

The evolved alkyl mercaptan obtained as by-product of the invention can be marketed as such since it is an article of commerce, or it can be oxidized, e.g. with air, to the corresponding disulfide.

The present invention is further illustrated by the examples set forth below.

EXAMPLES 1 TO 9

The following general procedure was followed in carrying out these examples. The nuclearly hydroxy-substituted aromatic compound, i.e. phenol or 3-methylphenol, and the sulfonic acid catalyst were mixed in a reaction vessel equipped with a mechanical stirrer, external heater, additional funnel and reflux condenser. The mixture was heated to reflux, and, with continued stirring, dropwise addition of the dialkyl disulfide, i.e. dimethyl disulfide, was begun. Refluxing occurred steadily, and methyl mercaptan was evolved as the reaction progressed. After addition of the dimethyl disulfide, the mixture was refluxed for an additional period and then vacuum distilled. When phenol was used as reactant, 2-methylmercaptophenol and 4-methylmercaptophenol were recovered as products. In the case of the 3-methylphenol reactant, the product was 3-methyl-4-methylmercaptophenol.

The results of the examples are set forth in Table I below.

*Table I*

| Example | Aromatic compound | Mol | Disulfide | Mol | Catalyst | Mol | Conditions | | | | 2-methylmercapto-product | | 4-methylmercapto-product | |
|---|---|---|---|---|---|---|---|---|---|---|---|---|---|---|
| | | | | | | | Addition | | Digestion | | B.P., °C. | Percent yield [1] | B.P., °C. | Percent yield [1] |
| | | | | | | | Hrs. | °C. | Hrs. | °C. | | | | |
| 1 | Phenol | 1.0 | Dimethyl | 1.0 | Methanesulfonic acid. | 0.05 | 2 | 140-145 | 1 | 145-150 | | | 13 | 46 |
| 2 | ...do | 1.0 | ...do | 1.0 | ...do | 0.08 | 2 | 140-145 | 1 | 145-150 | 105-110 at 20-25 mm. | 25 | 156-160 at 25-30 mm. | 66 |
| 3 | ...do | 1.0 | ...do | 1.0 | ...do | 0.16 | 2 | 143±1 | 1 | 150 | 104-108 at 20-30 mm. | 17 | 156-160 at about 30 mm. | 62 |
| 4 | ...do | 1.0 | ...do | 1.0 | ...do | 0.25 | 2 | 145-150 | 2 | 168-172 | | 9 | | 39 |
| 5 | ...do | 1.0 | ...do | 1.0 | Benzenesulfonic acid. | 0.03 | 2 | 160±2 | 1 | 160 | 102-105 at 20 mm. | 28 | 146-150 at 10-15 mm. | 75 |
| 6 | ...do | 1.0 | ...do | 1.0 | 96% $H_2SO_4$ (phenolsulfonic acid). | 0.04 | 2 | 130-135 | 2 | 130-135 | 100-104 at 10-15 mm. | 25 | 148-151 at 10-15 mm. | 80 |
| 7 | ...do | 1.25 | ...do | 1.0 | ...do | 0.25 | 4½ | 150-155 | 2 | 160-170 | | 13 | | 61 |
| 8 [2] | ...do | 1.0 | ...do | 0.8 | "Dowex-50" (acid form). | <0.1 | 1½ | 153±1 | 2 | 153±1 | 103-106 at 25 mm. | 18 | 153-156 at 25 mm. | 74 |
| 9 | 3-methylphenol. | 1.0 | ...do | 1.0 | Methanesulfonic acid. | 0.08 | 1 | 162±1 | 1.5 | 162±1 | | 0 | 224-228 at 1 atm. | 70 |

[1] Based on the aromatic compound consumed.
[2] Reaction mixture washed before distillation.

EXAMPLES 10 TO 26

In following Table II results of further experiments using the process described in connection with Examples 1 to 9 are set forth. In all of the examples, 0.04 mol of 96% $H_2SO_4$ was employed, and the reaction mixture was water-washed before vacuum distillation.

*Table II*

| Example | Aromatic compound | Mols | Disulfide | Mols | Conditions | | | | Product | B.P., °C. | Product | | |
|---|---|---|---|---|---|---|---|---|---|---|---|---|---|
| | | | | | Addition | | Digestion | | | | Percent sulfur | | Percent Yield |
| | | | | | Hrs. | °C. | Hrs. | °C. | | | Calculated | Found | |
| 10 | 3-isopropylphenol | 0.67 | Dimethyl | 0.67 | 3 | 145-150 | 5 | 145-150 | 3-isopropyl-4-methylmercaptophenol. | 145-150 at 2-3 mm. | 17.6 | 17.8 | [1] 97 |
| 11 | 3-ethylphenol | 1.0 | ...do | 1.0 | 1 | 150-130 | 4 | 130-150 | 3-ethyl-4-methylmercaptophenol. | 133-134 at 2-3 mm. | 19.0 | 18.6 | [1] 100 |
| 12 | 3-methyl-6-isopropylphenol. | 1.0 | ...do | 1.0 | 1 | 150-130 | 4 | 130-150 | 3-methyl-4-methylmercapto-6-isopropylphenol. | 130-132 at 3-4 mm. | 16.3 | 16.2 | [1] 96 |
| 13 | 3,5-diisopropylphenol. | 0.44 | ...do | 0.44 | 3 | 150-160 | 0.5 | 150-160 | 3,5-diisopropyl-4-methylmercaptophenol. | 154-157 at 2-3 mm. | 14.2 | 14.5 | [1] 86 |
| 14 | 2-methyl-5-isopropylphenol. | 1.67 | ...do | 1.67 | 1 | 150-130 | 4 | 130-150 | 2-methyl-4-methylmercapto-5-isopropylphenol. | 157-158 at 12 mm. | 16.3 | 15.9 | [1] 78 |
| 15 | 3,5-dimethylphenol. | 2.0 | ...do | 2.0 | 1 | 150-130 | 4 | 130-150 | 3,5-dimethyl-4-methylmercaptophenol. | 155-160 at 12 mm. | 19.0 | 19.3 | [1] 60 |
| 16 | 2-phenylphenol | 1.0 | ...do | 1.0 | 1 | 150-130 | 4 | 130-150 | 2-phenyl-4-methylmercaptophenol. | 195-200 at 15 mm. | 14.8 | 14.7 | [1] 77 |
| 17 | 3-methoxyphenol | 0.5 | ...do | 0.5 | 1 | 150-130 | 4 | 130-150 | 3-methoxy-4-methylmercaptophenol. | 154-156 at 4-5 mm. | | | [1] 61 |
| 18 | 4-methylphenol | 2.0 | ...do | 1.5 | 1 | 150-130 | 4 | 130-150 | 2-methylmercapto-4-methylphenol. | 145-150 at 12 mm. | | | [1] 74 |
| 19 | 4-chlorophenol | 2.0 | ...do | 2.0 | 1 | 150-130 | 4 | 130-150 | 2-methylmercapto-4-chlorophenol. | 164-168 at 15-20 mm. | 18.3 | 18.5 | [1] 71 |

See footnotes at end of table.

| Example | Aromatic compound | Mols | Disulfide | Mols | Conditions | | | | Product | B.P., °C. | Product | | Percent Yield |
|---|---|---|---|---|---|---|---|---|---|---|---|---|---|
| | | | | | Addition | | Digestion | | | | Percent sulfur | | |
| | | | | | Hrs. | °C. | Hrs. | °C. | | | Calculated | Found | |
| 20 | 1-naphthol | 1.0 | Dimethyl | 1.0 | 1 | 150-130 | 6 | 130-150 | 4-methylmercapto-1-naphthol. | >130 at 3-4 mm. | 16.6 | 16.7 | [1] 82 |
| 21 | Phenol | 2.0 | Diethyl | 1.6 | 1 | 160-170 | 2 | 160-170 | 2-ethylmercaptophenol. | 115-120 at 12 mm. | 20.9 | 20.0 | [1] 18 |
| | | | | | | | | | 4-ethylmercaptophenol. | 150-153 at 12 mm. | 20.9 | 21.9 | [1] 65 |
| 22 | 3-methylphenol | 2.5 | do | 0.82 | | | 3 | 160-165 | 3-methyl-4-ethylmercaptophenol. | 160-161 at 12 mm. | | | [1] 42 |
| 23 | Phenol | 3.4 | Di-n-butyl | 0.57 | | | 3 | 150-160 | 4-n-butylmercaptophenol. | 162-164 at 4 mm. | | | [2] 36 |
| 24 | do | 3.2 | Di-i-butyl | 0.57 | | | 8 | 160 | 4-i-butylmercaptophenol. | 200-210 at 40 mm. | | | [2] 34 |
| 25 | do | 3.2 | Di-n-amyl | 0.48 | | | 7 | 160-170 | 4-n-amylmercaptophenol. | 188-190 at 15 mm. | 16.3 | 15.6 | [2] 32 |
| 26 | do | 3.2 | Di-i-amyl | 0.48 | | | 12 | 150-155 | 4-i-amylmercaptophenol. | | 16.3 | 16.3 | [2] 38 |

[1] Based on the aromatic compound consumed.
[2] Based on the disulfide consumed.

While the above describes the preferred embodiments of our invention, it will be understood that departures may be made therefrom within the scope of the specification and claims.

We claim:

1. A process for the production of aromatic thioethers which comprises reacting a nuclearly hydroxy-substituted aromatic hydrocarbon compound selected from the group consisting of phenol, alkyl-substituted, aryl-substituted, halo-substituted and alkoxy-substituted phenols containing at least one of a free 2-position and a free 4-position, 1-naphthol and 2-naphthol with a dialkyl disulfide in the presence of a sulfonic acid catalyst selected from the group consisting of (1) alkyl-substituted sulfonic acids, (2) aryl-substituted sulfonic acids, (3) sulfonic acids formed by adding sulfuric acid to the nuclearly hydroxy-substituted aromatic hydrocarbon compounds and (4) sulfonic acid form ion-exchange resins, the mol ratio of sulfonic acid to disulfide being not more than about 0.25 to 1.

2. The process of claim 1 wherein the nuclearly hydroxy-substituted aromatic hydrocarbon compound is phenol.

3. The process of claim 1 wherein the nuclearly hydroxy-substituted aromatic hydrocarbon compound is an alkyl-substituted phenol containing at least one of a free 2-position and a free 4-position.

4. The process of claim 1 wherein the mol ratio of sulfonic acid to dialkyl disulfide is about 0.04-0.25 to 1.

5. The process of claim 1 wherein the catalyst is a sulfonic acid obtained by the addition of sulfuric acid to the nuclearly hydroxy-substituted aromatic hydrocarbon compound.

6. The process of claim 5 wherein the mol ratio of sulfonic acid to dialkyl disulfide is about 0.04-0.1 to 1.

7. The process of claim 6 wherein the nuclearly hydroxy-substituted aromatic hydrocarbon compound is phenol and the dialkyl disulfide contains alkyl groups having 1 to 5 carbon atoms.

8. The process of claim 6 wherein the nuclearly hydroxy-substituted aromatic hydrocarbon compound is phenol and the dialkyl disulfide is dimethyl disulfide.

9. The process of claim 8 carried out at the refluxing temperature of the reaction mixture.

10. The process of claim 9 wherein 4-methylmercaptophenol is recovered from the resulting reaction mass.

References Cited in the file of this patent
UNITED STATES PATENTS 2,745,878  Mavity _____ May 15, 1956
2,923,743  Delfs et al. _____ Feb. 2, 1960